(12) United States Patent
Norman et al.

(10) Patent No.: US 7,082,535 B1
(45) Date of Patent: *Jul. 25, 2006

(54) SYSTEM AND METHOD OF CONTROLLING ACCESS BY A WIRELESS CLIENT TO A NETWORK THAT UTILIZES A CHALLENGE/HANDSHAKE AUTHENTICATION PROTOCOL

(75) Inventors: Stuart Norman, Don Mills (CA); David E. Halasz, Stow, OH (US)

(73) Assignee: Cisco Technology, Inc., San Jose, CA (US)

( * ) Notice: Subject to any disclaimer, the term of this patent is extended or adjusted under 35 U.S.C. 154(b) by 778 days.

This patent is subject to a terminal disclaimer.

(21) Appl. No.: 10/124,285

(22) Filed: Apr. 17, 2002

(51) Int. Cl.
*H04L 9/00* (2006.01)
*H04K 1/00* (2006.01)
*G06F 15/173* (2006.01)
*G06F 15/16* (2006.01)

(52) U.S. Cl. ............... 713/163; 713/168; 713/182; 713/171; 709/225; 709/229; 709/230

(58) Field of Classification Search ............... 709/200, 709/223–225, 229, 230, 237, 210, 217–219, 709/202–203, 239; 713/155, 161, 164, 166, 713/168–171, 200–202, 163, 182

See application file for complete search history.

(56) References Cited

U.S. PATENT DOCUMENTS

| 4,658,093 | A | * | 4/1987 | Hellman ............... 705/52 |
| 4,995,082 | A | * | 2/1991 | Schnorr ............... 713/169 |
| 5,144,667 | A | * | 9/1992 | Pogue et al. ............... 380/45 |
| 5,721,779 | A | * | 2/1998 | Funk ............... 713/155 |
| 6,151,628 | A | * | 11/2000 | Xu et al. ............... 709/225 |
| 2003/0056096 | A1 | * | 3/2003 | Albert et al. ............... 713/168 |

* cited by examiner

*Primary Examiner*—Antony Nguyen-Ba
(74) *Attorney, Agent, or Firm*—Tucker Ellis & West LLP

(57) ABSTRACT

Architecture for controlling access by a Light Extensible Authentication Protocol (LEAP)-compatible wireless client to a network that utilizes a challenge/handshake authentication protocol (CHAP). A proxy service is hosted on a network server disposed on the network, and accessed in response to receiving access information from the client. The access information is processed with the proxy service into CHAP-compatible access information, and forwarded to a CHAP-based access control server disposed on the network to determine whether to grant network access to the client.

42 Claims, 3 Drawing Sheets

SYSTEM AND METHOD OF CONTROLLING ACCESS BY A WIRELESS CLIENT TO A NETWORK THAT UTILIZES A CHALLENGE/HANDSHAKE AUTHENTICATION PROTOCOL

BACKGROUND OF THE INVENTION

This application is related to pending U.S. patent application Ser. No. 10/017,544 entitled "Wireless Authentication Protocol" and filed Dec. 14, 2001, the entirety of which is incorporated herein by reference.

TECHNICAL FIELD OF THE INVENTION

This invention is related to wireless network connectivity, and more specifically, to providing a proxy service in wireless network legacy systems to facilitate wireless authentication.

BACKGROUND OF THE RELATED ART

The flood of wireless client devices into the market designed to connect to a network has brought security issues to the forefront. Thus authentication of the wireless client has become a common precondition to granting access to the network. The wireless network is a relative newcomer to authentication, authorization, and accounting (AAA) services provided by an access server (AS). A wireless access point (AP), such as the Cisco Aironet® series, provides a bridged connection for mobile clients into the local area network (LAN). Authentication is absolutely necessary because of the ease of access to the AP. Encryption is also a necessity because of the ease of eavesdropping on communications. As such, security plays an even bigger role than in the dial-up scenario.

AS support for IEEE 802.1x strengthens access control for switched LAN and wireless LAN users. IEEE 802.1x is a new access control standard for managing port-level access control, and relies on the Extensible Authentication Protocol (EAP), carried in RADIUS messages, to manage user authentication and authorization.

The AS provides access control to a network access server (NAS) through AAA, the architectural framework for configuring the set of three independent security functions. AAA provides a modular way of performing the following services: authentication provides the method of identifying users, including login and password dialog, challenge and response, messaging support, and, depending on the security protocol selected, possibly encryption; authorization provides the method for remote-access control, including one-time authorization or authorization for each service, per-user account list and profile, support for user groups, and support of IP, Internetwork Packet eXchange (IPX), AppleTalk Remote Access (ARA), and Telnet; and accounting provides the method for collecting and sending security server information used for billing, auditing, and reporting, such as user identities, start and stop times, number of packets, and number of bytes.

In the simple wireless LAN (WLAN), a single AP may be installed. Because there is only one AP, the primary issue is security. In this environment, there is generally a small user base and few network devices to worry about. Providing AAA services to the other devices on the network will not cause any significant additional load on the AS.

In a WLAN in which a number of APs are deployed, as in a large building or a campus environment, the decisions for updating to the latest security access equipment can be cost prohibitive. The cost issues become even more problematic when the may be applicable to a chain of small stores distributed throughout a city or state, nationally, or globally.

An AAA client is software running on a network device that enables the network device to defer authentication, authorization, and logging (accounting) of user sessions to a AAA server. AAA clients must be configured to direct all end-user client access requests to the AS for authentication of users and authorization of service requests. Using a RADIUS (Remote Authentication Dial-In User Service) protocol, the AAA client sends authentication requests to the AS. The AS verifies the username and password using the user databases it is configured to query. The AS then returns a success or failure response to the AAA client, which permits or denies user access, based upon the response it receives. When the user authenticates successfully, the AS sends a set of authorization attributes to the AAA client. The AAA client then begins forwarding accounting information to the AS.

RADIUS provides authentication and authorization in a single step. When the user logs onto the network, a network access server (NAS) responds by prompting the user for a username and a password. The NAS will then send the request to the AS. The NAS, also called an access point (AP) may include a request for access restrictions or per-user configuration information. The RADIUS server returns a single response with authentication approval status and any related access information available.

When the user has successfully authenticated, a set of session attributes can be sent to the AAA client to provide additional security and control of privileges, otherwise known as authorization. These attributes might include the IP address pool, access control list, or type of connection (for example, IP, IPX, or Telnet). More recently, networking vendors are expanding the use of attribute sets returned to cover an increasingly wider aspect of user session provisioning. In addition to a set of predefined RADIUS vendors and vendor-specific attributes (VSAs), the AS supports RADIUS vendors and VSAs that can be defined by the user. Vendors added must be IETF-compliant; therefore, all VSAs that are added must be sub-attributes of IETF RADIUS attribute number 26.

The rapid evolution of such network systems and devices also poses compatibility and upgrade issues to those networks that lag behind in the latest authentication technology. EAP-Cisco Wireless (also denoted LEAP-Light Extensible Authentication Protocol) is a new authentication type. Thus it is not likely to be supported in a wide variety of RADIUS servers. Thus what is needed is an architecture that can be implemented into the legacy network to facilitate access control of such latest client devices that utilize LEAP.

SUMMARY OF THE INVENTION

The present invention disclosed and claimed herein, in one aspect thereof, comprises architecture for controlling access by a LEAP wireless client to a network that utilizes a challenge/handshake authentication protocol (CHAP). A LEAP proxy service is hosted on a network server disposed on the network, and accessed in response to receiving access information from the client. The access information is processed with the proxy service into CHAP-compatible access information, and forwarded to a CHAP-based access control server disposed on the network to determine whether to grant network access to the client.

In another aspect thereof, the proxy service is hosted on an access point, and still another aspect thereof, on a RADIUS server.

BRIEF DESCRIPTION OF THE DRAWINGS

For a more complete understanding of the present invention and the advantages thereof, reference is now made to the following description taken in conjunction with the accompanying drawings, in which:

FIG. 1a illustrates a block diagram of a conventional system where the AAA service is provided solely by an AS;

DETAILED DESCRIPTION OF THE INVENTION

The disclosed LEAP (Light Extensible Authentication Protocol) proxy architecture allows an existing legacy AAA system running EAP to utilize LEAP. The wireless client can continue to utilize LEAP, but communicates to a RADIUS server that supports MS-CHAP. The LEAP proxy allows MS-CHAP to be used for EAP authentication and encryption key distribution. The proxy service can be run on an AP or a RADIUS server that supports LEAP.

Proxy enables the access server (AS) to automatically forward an authentication request from a network access server (NAS) to another AS. After the request has been successfully authenticated, the authorization privileges that have been configured for the user on the remote AS are passed back to the original AS, where the user profile information is applied for that session on the NAS. This proxy tool that can expand the use of the AS by minimizing the number of users that need to be configured in a locally defined database. Group information, for example, does not need to be maintained on the local AS. Another advantage is that the organization is not limited to AS. Other vendor AAA products can be used.

The LEAP authentication proxy service is useful, for example, when you want to manage access privileges on an individual (per-user) basis using the services provided by the AS instead of configuring access control based upon a host IP address or global access policies. Authenticating and authorizing users from any host IP address also allows network administrators to configure host IP addresses using DHCP. Another example is where authentication and authorization of local users is desired before permitting access to intranet or Internet services or hosts through a firewall or access to local services or hosts through the firewall. Still another example is the need to control access for specific extranet users such as a financial officer of a corporate partner with one set of access privileges while authorizing the technology officer for that same partner to use another set of access privileges. Additionally, the authentication proxy can be used in conjunction with VPN (Virtual Private Network) client software to validate users and to assign specific access privileges.

Figure 1A:
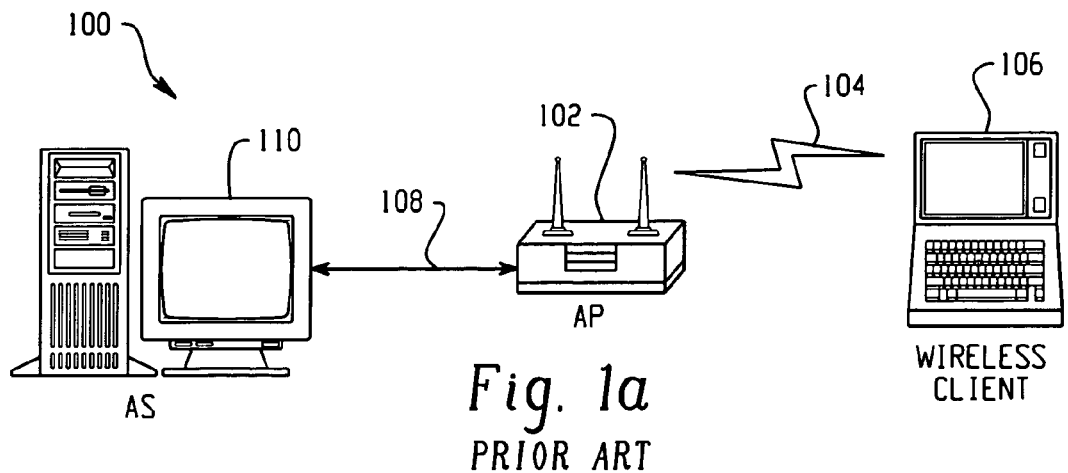

Referring now to FIG. 1a, there is illustrated a block diagram of a conventional system 100 where the AAA service is provided solely by an AS 110. A wireless client 106 comes into communication range of an access point (AP) 102, and associates with the AP 102 via a wireless communication link 104. Generally, the AP 102 then sends access information in the form of an identity request signal to the client 106. The client 106 responds to the AP 102 with client identity information. Since the client 106 has yet to be validated, the AP 102 tags or restructures the client identity information such that the AS 110 recognizes it as coming from a trusted network entity, i.e., the AP 102. The client identity information is then passed from the AP 102 on a wired network 108 to the AS 110. The AS 110 extracts the client identity information and searches a database of user information to determine if the client 106 is in the database. If not, the AS 110 transmits a "deny" message to the AP 102. The AP 102 then disassociates the client 106, and all future data traffic from the client 106 is prohibited until the client 106 attempts to associate and authenticate again. At this point, the client 106 may display a message to the user that the connection was denied, and that other actions may be required, for example, to re-enter the login information, or to contact a network technician. Note that the user database may be hosted on the AS 110, or another server disposed on the network 108.

On the other hand, if the AS 110 finds the user in the database, the AS 110 authenticates the user and acknowledges that the user is an authorized user, and transmits a "success" message across the network medium 108 to the AP 102. The client 106 is now granted full access to the services of the network. All future transmissions from the client 106 to the AP 102 are then passed through the AP 102 unimpeded.

However, in a mutual authentication regime, the client 106 now challenges the "network" to ensure that it is the network to which the client 106 wants to connect. Thus the client 106 now extends a challenge to the network by transmitting a client challenge signal thereto, which of course is to the AP 102. The client challenge signal is received by the AP 102 and transmitted to the AS 110. The AS 110 responds to the client challenge by sending a network response signal back to the client 106. If validated by the client 106, the AP 102 and client 106 exchange session keys such that further communications therebetween are secure. Of course, if the client 106 determines that the network is the wrong network, it simply disassociates from the AP 102 and communications therebetween cease.

Figure 1B:
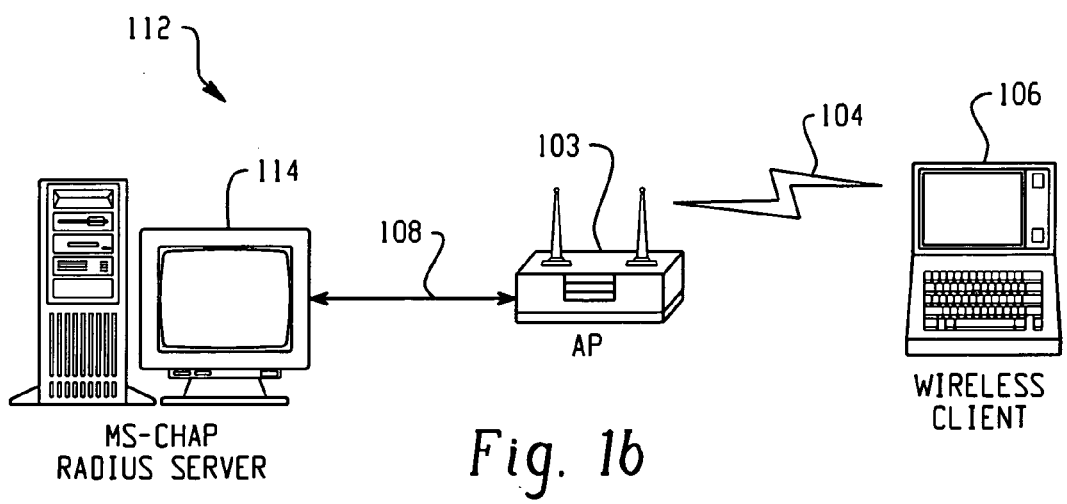
FIG. 1b illustrates a block diagram of an AP proxy system where the proxy service is implemented on an AP proxy, according to a disclosed embodiment.

Referring now to FIG. 1b, there is illustrated a block diagram of an AP proxy system 112 where the proxy service is implemented on an AP Proxy 103, according to a disclosed embodiment. The wireless client 106 comes into communication range of the AP Proxy 103, and associates with the AP Proxy 103 via the wireless communication link 104. Association of the client 106 includes the client 106 sending access information in the form of an EAPOL (EAP Over LAN) Start signal to the AP Proxy 103, and the AP Proxy 103 responding with an EAPOL Request ID message to the client 106. The client 106 sends an EAPOL Identity Response message to the AP Proxy 103. The AP Proxy 103 receives the Identity Response message, and responds with a LEAP Challenge Request message back to the client 106. The client 106 responds with a LEAP Challenge Response to the AP Proxy 103, which AP Proxy 103 then forwards the LEAP Challenge and Challenge Response to an AS server 114 (e.g., a RADIUS server) over the wired network 108. Continuing the description in the context of the AS 114 being a RADIUS server, the LEAP Challenge Response is forwarded to the RADIUS server 114 in the form of a dial-up request, the format compatible with the protocol of the RADIUS server 114. In that the RADIUS server 114 is operable to utilize the MS-CHAP (MICROSOFT Challenge-Handshake Authentication Protocol), the client challenge message forwarded from the AP Proxy 103 is an Access Request message with MS-CHAP Challenge message having a MICROSOFT attribute and an MS-CHAP Response message having a MICROSOFT attribute.

The RADIUS server 114 receives the Access Request with MS-CHAP Challenge message and MS-CHAP challenge Response, extracts the client username information therefrom, and performs a check against the MS-CHAP Challenge and MS-CHAP Response to determine if the user of the username is an authorized user.

Note that passwords can be processed using these password authentication protocols based on the version and type of security control protocol used (for example, RADIUS or TACACS+) and the configuration of the AAA client and end-user client. The following provides more detail about the conditions and functions of password handling for CHAP, and the variations thereof. CHAP allows a higher level of security for encrypting passwords when communicating from an end-user client to the AAA client. CHAP uses a challenge-response mechanism with one-way encryption on the response. CHAP enables the Access Server (e.g., AS 110) to negotiate downward from the most secure to the least secure encryption mechanism, and it protects passwords transmitted in the process. CHAP passwords are reusable. If a secure user database is being utilized for authentication, either PAP or CHAP can be used. However, CHAP does not work with the WINDOWS NT/2000 operating system user database. Thus MS-CHAP is supported by the AS for user authentication. The MS-CHAP Response packet is in a format compatible with MICROSOFT WINDOWS NT/2000, WINDOWS 95/98/ME, and LAN MANAGER 2.x operating systems. The MS-CHAP format does not require the authenticator to store a clear-text or reversibly encrypted password. MS-CHAP provides an authentication-retry mechanism controlled by the authenticator, and MS-CHAP provides additional failure codes in a Failure packet Message field.

The disclosed proxy architecture also supports MS-CHAP version 2 Support and MS-CHAP Password Aging Support. The MS-CHAP-based password-aging feature works with the MICROSOFT Dial-Up Networking client, and any desktop client that supports MS-CHAP. This feature prompts a user to change his or her password after a login where the user password has expired. The MS-CHAP-based password-aging feature supports users who authenticate with a WINDOWS operating system user database and is offered in addition to password aging.

Continuing with the description of FIG. 1*b*, after receiving the Access Request with MS-CHAP Challenge and MS-CHAP challenge Response message from the AP Proxy 103, the RADIUS server 114 determines whether the client 106 should be granted access or denied access to the network. If the username is not in the database or the MS-CHAP challenge Response was incorrect, the client 106 is denied access to the network and associated network services, indicated in an EAP Failure message being sent to the AP Proxy 103. If the username is in the database and the MS-CHAP challenge Response was correct, the client 106 is granted access, which is evidenced by an EAP Success message being sent to the AP Proxy 103. Included in the EAP Success message by the RADIUS server 114 is an MS_CHAP_MPPE_KEYS attribute that is decrypted and provides the hashed password, which hashed password is saved. As far as the network is now concerned, the client 106 is granted access to the network.

In that this is a mutual authentication regime, the client 106 now challenges the network. The client 106 sends a LEAP Challenge to the AP Proxy 103. When the AP Proxy 103 receives the LEAP Challenge, the AP Proxy 103 generates a network response in the form of 24-bytes of the Challenge response text that is hashed using the MS-CHAP algorithm and password hash. The AP Proxy 103 then sends the keys to the client 106 in an EAPOL-KEY message.

Figure 1C:
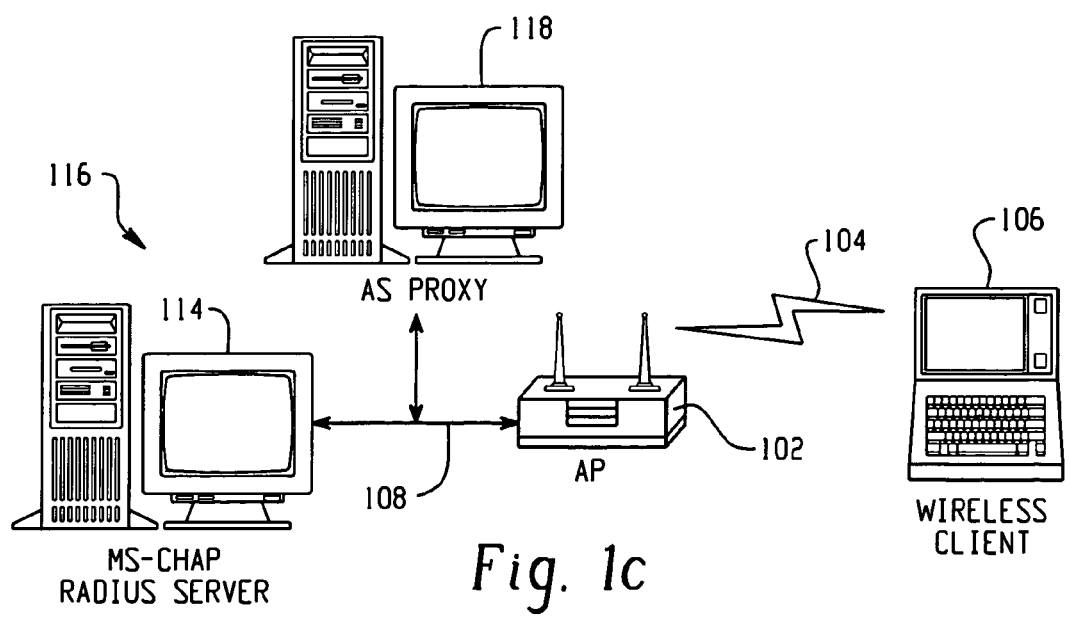
FIG. 1c illustrates a block diagram of the process when the proxy service resides on the AS Proxy server.

Referring now to FIG. 1*c*, there is illustrated a block diagram of an AS proxy system 116 where the proxy service is implemented on an AS proxy RADIUS server 118, according to a disclosed embodiment. The wireless client 106 comes into communication range of the AP 102, and associates with the AP 102 via the wireless communication link 104. The client 106 sends an EAPOL-START message to the AP 102, to which AP 102 responds with an EAPOL Identity Request message. The client 106 then responds with an EAPOL Identity response that is forwarded through the AP 102 to the AS Proxy 118. The AS Proxy 118 then responds with an EAPOL Challenge to the client 106 via the AP 102. The client 106 responds with an EAPOL Response through the AP 102 to the AS Proxy 118. The AS Proxy 118 processes the received client response and forwards an Access Request with MS-CHAP Challenge and MS-CHAP Response attributes to the RADIUS server 114. As before, if the client 106 is not in the database or the MS-CHAP challenge Response does not correspond to the MS-CHAP Challenge, the RADIUS server 114 denies access to the client 106 and responds to the client 106 with an EAP Failure attribute that is sent in a RADIUS deny message to the AP 102. However, if the client 106 is in the database and the MS-CHAP challenge Response does correspond to the MS-CHAP Challenge, the RADIUS server 114 creates an EAP Success attribute and inserts it into a RADIUS Challenge message to the AS Proxy 118. The users password hash is then saved by the AS Proxy 118 by retrieving the MS_CHAP_MPPE_KEYS attribute from the Accept message, decrypting it, and saving the password hash.

The client 106 then challenges the network by sending an EAPOL Network Challenge through the AP 102 to the AS Proxy 118. When the LEAP Challenge is received at the AS Proxy 118, a LEAP Response is formatted as an EAP attribute, and the key is sent to the AP 102 in the CISCO session key attribute in a RADIUS Accept message to the AP 102.

Figure 2:
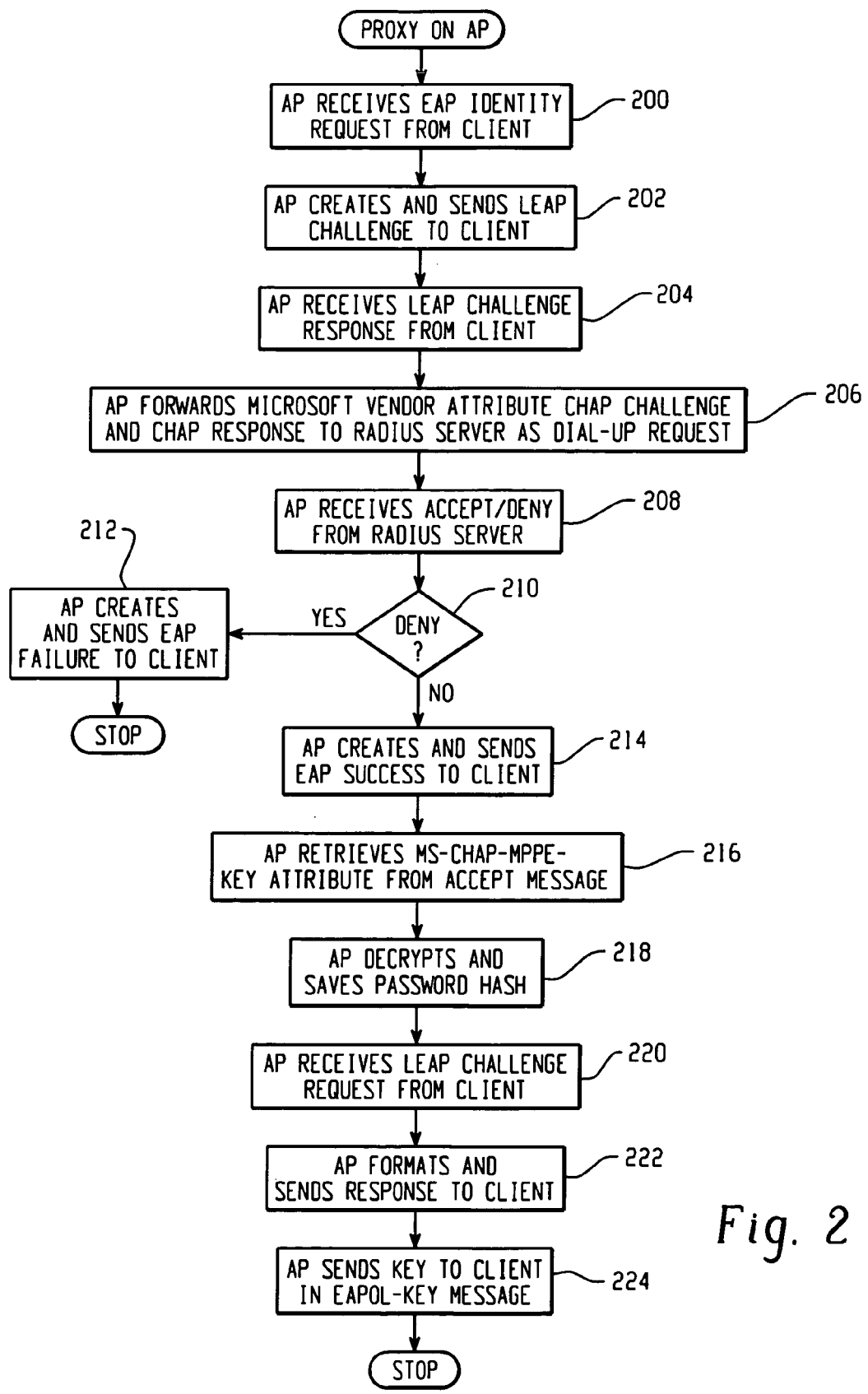
FIG. 2 illustrates a flow chart of the process of an access point hosting the proxy service and communicating with a generic RADIUS server.

Referring now to FIG. 2, there is illustrated a flow chart of the process where the AP Proxy 103 of FIG. 1*b* hosts the proxy service and communicates with a generic RADIUS server 114. Flow begins at a function block 200 where the AP Proxy 103 receives an EAP Identity Request signal from the client 106. In a function block 202, the AP Proxy 103 then creates and sends a LEAP Challenge to the wireless client 106. The LEAP Challenge signal contains the following attributes: byte code=EAP Request; byte identifier=from identity response; word length; byte type=LEAP=17; byte LEAP algorithm=1; byte=0; byte challenge length=8; eight bytes of random data; and N bytes of identity from identity response. Flow is to a function block 204 where the AP Proxy 103 receives the LEAP challenge Response from the client 106. In a function block 206, the AP Proxy 103 forwards a MICROSOFT vendor attribute MS-CHAP Challenge and MS-CHAP challenge Response to the RADIUS server 114 as though it were an MS-CHAP dial-up request.

The signal has the following attributes: service type=2; protocol type=1; port type=0; MICROSOFT vendor attribute CHAP CHALLENGE with challenge that was sent to the client 106; and MICROSOFT vendor attribute CHAP RESPONSE with client 106 response to challenge. The RADIUS server 114 processes the response received through the AP Proxy 103 from the client 106, and determines whether to accept or deny access to the client 106. The RADIUS server 114 then forwards the result to the AP Proxy 103, as indicated in a function block 208.

Flow is then to a decision block 210 to determine an action the AP Proxy 103 takes in response to either an Accept or a Deny message. If a determination is made to deny access, flow is out the "Y" path to a function block 212 where the AP Proxy 103 creates and sends an EAP Failure signal to the client 106. Flow is then to a Stop terminal. On the other hand, if the RADIUS server 114 chooses to allow access to the client 106, flow is out the "N" path to a function block 214 where the AP Proxy 103 creates and sends and EAP Success signal to the client 106. In a function block 216, the AP Proxy 103 retrieves the MS_CHAP_MPPE_KEYS attribute information from the Accept message. In a function block 218, the AP Proxy 103 then decrypts and saves the password hash.

Flow is then to a function block 220 where the client 106 challenges the network by sending a LEAP Challenge request to the AP Proxy 103. The client 106 Challenge signal has the following information: byte code=EAP_RESPONSE; byte identifier=from request; word length; byte type=LEAP=17; byte LEAP algorithm=1; byte=0; byte response length=24; twenty-four bytes of challenge text are hashed using the MS-CHAP algorithm and the password hash; and N bytes of identity (that was after the challenge) are copied from the request. The AP Proxy 103 then formats and sends the response to the client 106, as indicated in a function block 222. In a function block 224, the AP Proxy 103 then sends the keys to the client 106 in an EAPOL-KEY message. Flow then reaches a Stop terminal.

Figure 3:
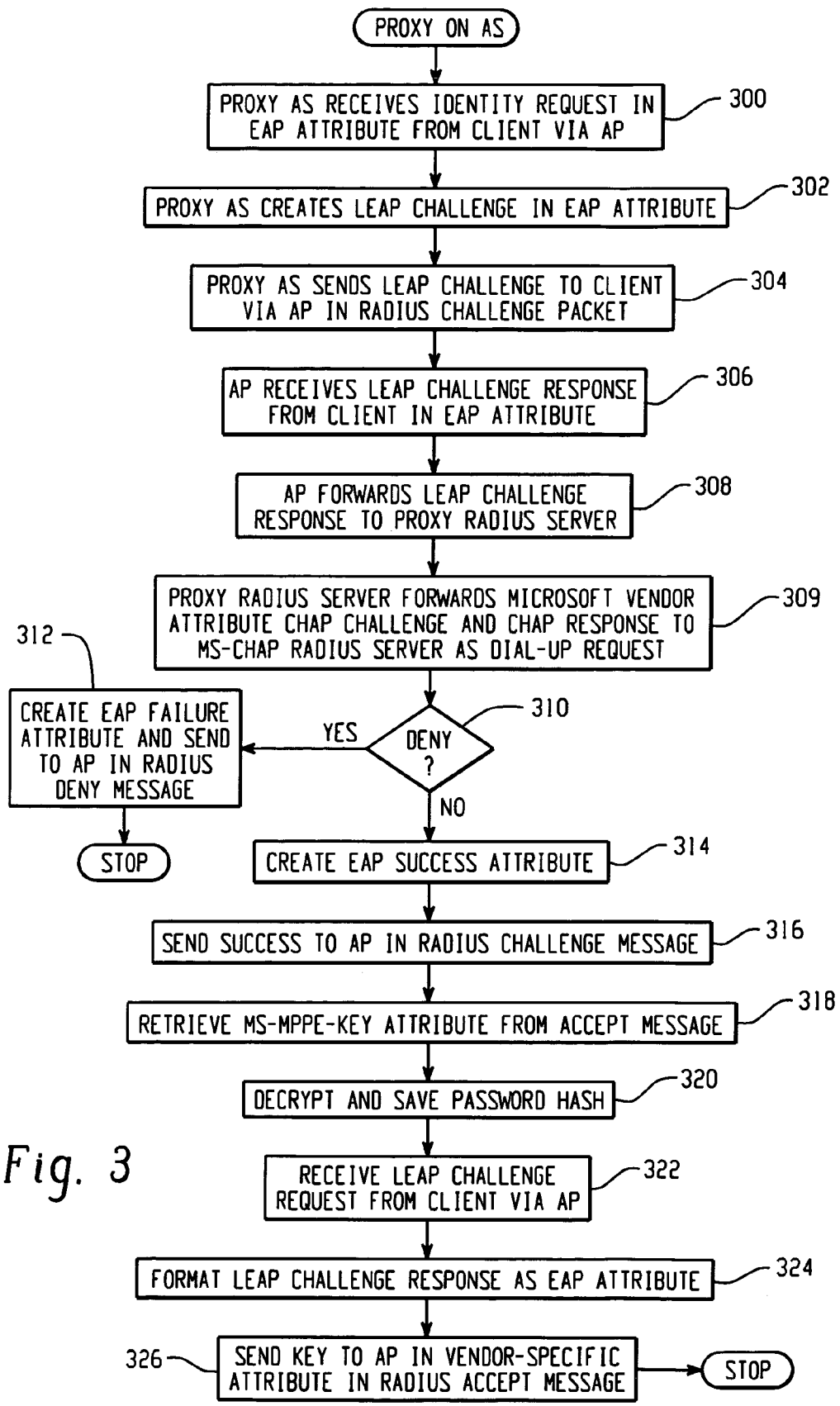
FIG. 3 illustrates a flow chart of the process when the proxy resides on the RADIUS server.

Referring now to FIG. 3, there is illustrated a flow chart of the process when the proxy service resides on the AS Proxy server 118. Flow begins at a function block 300 where the AS Proxy RADIUS server 118 receives an Identity Request in EAP attribute from the client 106 via the AP 102. In a function block 302, the AS Proxy server 118 then creates a LEAP challenge in an EAP attribute. Flow is then to a function block 304 where the AS Proxy server 118 sends a LEAP Challenge to the client 106 via the AP 102 in a RADIUS challenge packet. The client 106 receives the LEAP Challenge and transmits a LEAP challenge Response. The AP 102 then receives the LEAP challenge Response in EAP attribute from the wireless client 106, as indicated in a function block 306. Flow is then to a function block 308 where the AP 102 forwards the LEAP challenge Response to the AS Proxy RADIUS server 118.

Flow is then to a function block 309 where the AS Proxy RADIUS server 118 forwards the LEAP Challenge and LEAP challenge Response to the MS-CHAP RADIUS Server 114 as a Dial-up request with MICROSOFT vendor attribute CHAP Challenge and CHAP challenge Response. In a decision block 310, a decision is made as to whether to deny or grant the client 106 access to the network. If access is denied, flow is out the "Y" path to a function block 312 where an RAP failure attribute is created and sent to the AP 102 in a RADIUS Deny message. Flow then reaches a Stop terminal. On the other hand, if access is granted, flow is out the "N" path of decision block 310 to a function block 314 where an EAP Success attribute is created. Flow is then to a function block 316 where a success message is sent to the AP 102 in a RADIUS Challenge message. The MS_CHAP_MPPE_KEY is then retrieved and saved from the Accept message, as indicated in a function block 318. Flow is then to a function block 320 where the key is decrypted and saved utilizing the password hash. In a function block 322, the LEAP Challenge Request is then received from the client 106 via the AP 102 at the AS Proxy RADIUS server 118. The LEAP challenge response is then formatted as an EAP attribute, as indicated in a function block 324. Flow is then to a function block 326 where the key is then sent to the AP 102 in a vendor-specific attribute in a RADIUS Accept message. Flow then reaches a Stop terminal.

Although the preferred embodiment has been described in detail, it should be understood that various changes, substitutions, and alterations can be made therein without departing from the spirit and scope of the invention as defined by the appended claims.

What is claimed is:

1. A method of controlling access by a Light Extensible Authentication Protocol (LEAP)-compatible wireless client to a network that utilizes a Challenge Handshake Authentication Protocol (CHAP)-compatible protocol, comprising the steps of:
   accessing a proxy service on the network in response to receiving access information from the client;
   processing the access information with the proxy service into CHAP-compatible access information; and
   forwarding the CHAP-compatible access information to a CHAP-based access control server disposed on the network that determines whether to grant network access to the client.

2. The method of claim 1, wherein the proxy service in the step of accessing is hosted on an access point that is disposed on the network such that the access information is processed into the CHAP-compatible access information on the access point, in the step of processing.

3. The method of claim 2, wherein the access point forwards the CHAP-compatible access information in the step of forwarding to a Remote Authentication Dial-In User Service (RADIUS)-compatible server disposed on the network, in the form of a dial-up request.

4. The method of claim 1, wherein the CHAP-based access control server in the step of forwarding is a Remote Authentication Dial-In User Service (RADIUS)-compatible server.

5. The method of claim 4, wherein the RADIUS-compatible server accesses a database to determine whether the client is granted access to the network, which RADIUS-compatible server sends an Extensible Authentication Protocol (EAP)-compatible failure message to the client when access to the network is denied and sends an EAP-compatible success message to the client when access to the network is granted.

6. The method of claim 5, wherein the EAP-compatible success message includes a key attribute that is decrypted to provide a hashed password.

7. The method of claim 1, wherein the challenge handshake authentication protocol is a MICROSOFT CHAP (MS-CHAP)-based protocol.

8. The method of claim 1, further comprising the step of sending a LEAP-compatible challenge message from the client to the network in response to the grant of network access to the client in the step of forwarding.

9. The method of claim 8, wherein an access point receives the LEAP-compatible challenge message and processes the LEAP-compatible challenge message into the CHAP-compatible access information in the step of processing utilizing the proxy service.

10. The method of claim 1, wherein the proxy service in the step of accessing is LEAP-compatible, and the access information is LEAP-compatible access information.

11. The method of claim 1, wherein the proxy service in the step of accessing responds to receiving the access information from the client by transmitting a LEAP-compatible Challenge message to the client.

12. The method of claim 1, wherein the proxy service in the step of accessing transmits a LEAP-compatible Challenge of an access point and a LEAP-compatible challenge Response of the client to the access control server in the form of CHAP-compatible messages.

13. The method of claim 1, wherein the proxy service in the step of accessing responds to receiving the access information from the client by transmitting a LEAP-compatible Challenge message to the client.

14. The method of claim 1, wherein if the client is granted network access, the client authenticates the network by sending a LEAP-compatible Challenge message to the proxy service.

15. The method of claim 1, wherein the proxy service in the step of accessing is hosted on a Remote Authentication Dial-In User Service (RADIUS)-compatible server disposed on the network, which proxy RADIUS-compatible server receives the access information via an access point disposed on the network and processes the access information into the CHAP-compatible access information in the step of processing.

16. The method of claim 15, wherein access information is an Extensible Authentication Protocol (EAP)-compatible identity response in an EAP-compatible attribute received from the client, in response to which the proxy RADIUS-compatible server utilizes the proxy service to create a LEAP-compatible challenge in an EAP-compatible attribute for transmission to the client via the access point.

17. The method of claim 15, wherein the proxy RADIUS-compatible server is a LEAP-compatible server that forwards the CHAP-compatible access information in the step of forwarding to the CHAP-based access control server that is a second RADIUS-compatible server.

18. The method of claim 17, wherein the CHAP-compatible access information is a MICROSOFT CHAP (MS-CHAP)-compatible request in the form of a dial-up message.

19. The method of claim 18, wherein the MS-CHAP-compatible request includes a MS-CHAP-compatible challenge and a MS-CHAP-compatible response attributes.

20. The method of claim 17, wherein the second RADIUS-compatible server determines whether to grant the network access to the client, which second RADIUS-compatible server sends an Extensible Authentication Protocol (EAP)-compatible failure attribute in a RADIUS-compatible deny message to the access point when the network access is denied to the client and sends an EAP-compatible success attribute in a RADIUS-compatible challenge message to the access point when the network access is granted to the client.

21. The method of claim 20, wherein the client transmits a LEAP-compatible challenge to the access point in response to receiving the EAP-compatible success attribute in the RADIUS-compatible challenge message from the access point.

22. The method of claim 21, wherein the RADIUS-compatible server utilizes the proxy service to format a LEAP-compatible response as an EAP-compatible attribute after receiving the LEAP-compatible challenge, and sends a key to the access point.

23. The method of claim 22, wherein the key is contained within a session key attribute of a RADIUS-compatible accept message that is sent to the access point.

24. The method of claim 15, wherein the proxy RADIUS-compatible server forwards a LEAP-compatible challenge message and a LEAP-compatible challenge response message to a second RADIUS-compatible server as a dial-up message with a vendor attribute CHAP-compatible challenge and CHAP-compatible challenge response.

25. A method of controlling access by a Light Extensible Authentication Protocol (LEAP)-compatible wireless client to a network that utilizes a Challenge Handshake Authentication Protocol (CHAP)-compatible protocol, comprising the steps of:
   accessing a proxy service hosted on an access point that is disposed on the network, which proxy service is accessed in response to receiving access information from the client;
   processing the access information with the proxy service into CHAP-compatible access information; and
   forwarding the CHAP-compatible access information to a CHAP-based Remote Authentication Dial-In User Service (RADIUS)-compatible access control server disposed on the network, which access control server accesses a database to determine whether to grant network access to the client.

26. The method of claim 25, wherein the proxy service in the step of accessing is LEAP-compatible, and the access information is LEAP-compatible access information.

27. The method of claim 25, wherein the proxy service in the step of accessing retrieves a CHAP-compatible key attribute from an accept message transmitted to the access point by the access control server when the client is granted network access.

28. The method of claim 27, wherein a key is decrypted to provide a hashed password that is used to establish network access in a mutual authentication regime.

29. A method of controlling access by a Light Extensible Authentication Protocol (LEAP)-compatible wireless client to a network that utilizes a Challenge Handshake Authentication Protocol (CHAP)-compatible protocol, comprising the steps of:
   accessing a proxy service hosted on a proxy Remote Authentication Dial-In User Service (RADIUS)-compatible server that is disposed on the network, which proxy RADIUS-compatible server is accessed in response to receiving access information from the client;
   processing the access information with the proxy service into CHAP-compatible access information; and
   forwarding the CHAP-compatible access information to a second CHAP-based RADIUS-compatible access control server disposed on the network, which access control server accesses a database to determine whether to grant network access to the client.

30. The method of claim 29, wherein the proxy service in the step of accessing is LEAP-compatible, and the access information is LEAP-compatible access information.

31. The method of claim 29, wherein the proxy service in the step of accessing transmits a LEAP-compatible challenge to the client via an access point on the network, and in response to which the client transmits a LEAP-compatible response.

32. The method of claim 29, wherein the proxy RADIUS-compatible server transmits both a LEAP-compatible challenge message and a LEAP-compatible response from the client to the second RADIUS-compatible server as a dial-up request with a vendor attribute CHAP-compatible challenge and CHAP-compatible response.

33. The method of claim 29, wherein if network access is granted, a key is decrypted to provide a hashed password that is used to establish network access in a mutual authentication regime.

34. A network access control system for a Light Extensible Authentication Protocol (LEAP)-compatible wireless client that utilizes a Challenge Handshake Authentication Protocol (CHAP)-compatible protocol, comprising:
　　a proxy service hosted on an access point that is disposed on the network, which proxy service is accessed in response to receiving access information from the client, the access information processed with the proxy service into CHAP-compatible access information; and
　　a CHAP-based Remote Authentication Dial-In User Service (RADIUS)-compatible access control server disposed on the network to which the CHAP-compatible access information is forwarded, which RADIUS-compatible access control server accesses a database to determine whether to grant network access to the client.

35. The system of claim 34, wherein the proxy service is LEAP-compatible, and the access information is LEAP-compatible access information.

36. The system of claim 34, wherein the proxy service retrieves a CHAP-compatible key attribute from an accept message transmitted to the access point by the access control server when the client is granted network access.

37. The system of claim 34, wherein a key is decrypted to provide a hashed password that is used to establish network access in a mutual authentication regime.

38. A network access control system for a Light Extensible Authentication Protocol (LEAP)-compatible wireless client that utilizes a Challenge Handshake Authentication Protocol (CHAP) compatible protocol, comprising:
　　a proxy service hosted on a proxy Remote Authentication Dial-In User Service (RADIUS)-compatible server that is disposed on the network, which proxy RADIUS-compatible server is accessed in response to receiving access information from the client, the access information processed with the proxy service into CHAP-compatible access information; and
　　a second CHAP-based RADIUS-compatible access control server disposed on the network to which the CHAP-compatible access information is forwarded, which RADIUS-compatible access control server accesses a database to determine whether to grant network access to the client.

39. The system of claim 38, wherein the proxy service is LEAP-compatible, and the access information is LEAP-compatible access information.

40. The system of claim 38, wherein the proxy service transmits a LEAP-compatible challenge to the client via an access point on the network, and in response to which the client transmits a LEAP-compatible response.

41. The system of claim 38, wherein the proxy RADIUS-compatible server transmits both a LEAP-compatible challenge message and a LEAP-compatible response from the client to the second RADIUS-compatible server as a dial-up request with a vendor attribute CHAP-compatible challenge and CHAP-compatible response.

42. The system of claim 38, wherein if network access is granted, a key is decrypted to provide a hashed password that is used to establish network access in a mutual authentication regime.

\* \* \* \* \*